United States Patent
Takimoto et al.

(10) Patent No.: US 7,841,441 B2
(45) Date of Patent: Nov. 30, 2010

(54) AIRBAG APPARATUS

(75) Inventors: Takayuki Takimoto, Tokyo (JP); Hiroyuki Takahashi, Aichi (JP)

(73) Assignees: Takata Corporation, Tokyo (JP); Toyota Jidosha Kabushiki Kaisha, Aichi (JP)

( * ) Notice: Subject to any disclaimer, the term of this patent is extended or adjusted under 35 U.S.C. 154(b) by 158 days.

(21) Appl. No.: 12/162,109

(22) PCT Filed: Nov. 29, 2006

(86) PCT No.: PCT/JP2006/324309

§ 371 (c)(1), (2), (4) Date: Jul. 24, 2008

(87) PCT Pub. No.: WO2007/094116

PCT Pub. Date: Aug. 23, 2007

(65) Prior Publication Data

US 2009/0001691 A1    Jan. 1, 2009

(30) Foreign Application Priority Data

Jan. 25, 2006    (JP) ............................. 2006-016323

(51) Int. Cl.
*B60R 21/34* (2006.01)
(52) U.S. Cl. .................................. 180/274; 280/728.2
(58) Field of Classification Search ............. 280/728.1, 280/728.2, 740, 742; 180/274; 296/187.04, 296/193.11, 193.12
See application file for complete search history.

(56) References Cited

U.S. PATENT DOCUMENTS

| | | | | |
|---|---|---|---|---|
| 5,096,222 | A | * | 3/1992 | Komerska et al. ........... 280/732 |
| 5,195,775 | A | * | 3/1993 | Komerska et al. ........... 280/732 |
| 6,431,581 | B1 | * | 8/2002 | Wagener et al. ........... 280/728.2 |
| 6,827,170 | B2 | | 12/2004 | Hamada et al. |
| 6,923,286 | B2 | | 8/2005 | Sato et al. |
| 2003/0159875 | A1 | * | 8/2003 | Sato et al. .................... 180/274 |
| 2005/0205333 | A1 | * | 9/2005 | Mori et al. ................... 180/274 |
| 2009/0000847 | A1 | | 1/2009 | Takimoto et al. |

FOREIGN PATENT DOCUMENTS

| | | | |
|---|---|---|---|
| EP | 1 338 483 A2 | 8/2003 |
| EP | 1 464 552 A1 | 10/2004 |

(Continued)

OTHER PUBLICATIONS

Machine Translation of JP 2005-280556.*

(Continued)

*Primary Examiner*—Paul N Dickson
*Assistant Examiner*—Joseph Rocca
(74) *Attorney, Agent, or Firm*—Fitch, Even, Tabin & Flannery

(57) ABSTRACT

An airbag apparatus for pedestrian protection capable of preventing or suppressing deformation of a case in a width-expanding direction when an airbag is expanded, by means of a simple countermeasure, is provided with a case for housing a folded airbag, an inflator for expanding the airbag, a lid that closes an opening of a hood for passing an airbag, and so forth. In the middle of the case in a longitudinal direction, a tie plate serving as a connecting member connecting a front wall portion and a rear wall portion is provided.

7 Claims, 5 Drawing Sheets

FOREIGN PATENT DOCUMENTS

| | | |
|---|---|---|
| EP | 1 980 457 A1 | 10/2008 |
| JP | 09-164906 A | 6/1997 |
| JP | 2001-277979 A | 10/2001 |
| JP | 2003-291756 A | 10/2003 |
| JP | 2003-291772 A | 10/2003 |
| JP | 2005-280556 A | 10/2005 |
| JP | 2005-297725 A | 10/2005 |

OTHER PUBLICATIONS

Machine Translation of JP 2001-277979.*

Notification of the First Office Action issued in Chinese Application No. 200680051787.8 dated Jan. 15, 2010 (5 pages) and an English translation of the same (6 pages).

* cited by examiner

US 7,841,441 B2

AIRBAG APPARATUS

CROSS-REFERENCE TO RELATED APPLICATIONS

This application is a U.S. national phase application filed under 35 U.S.C. §371 of International Application PCT/JP2006/324309, filed on Nov. 29, 2006, designating the United States, which claims priority from JP 2006-016323, filed Jan. 25, 2006, which are hereby incorporated herein by reference in their entirety.

FIELD OF THE INVENTION

The present invention relates to an airbag apparatus having an airbag that is extended along at least a part of a hood of a vehicle body.

BACKGROUND OF THE INVENTION

An airbag apparatus for pedestrian protection is known in which a pedestrian or the like (a body of a pedestrian or that of a motorcycle rider) is received by expanding an airbag along a portion in the vicinity of a cowl portion of a vehicle body. As an embodiment of the airbag apparatus for pedestrian protection, an airbag apparatus for pedestrian protection in which an airbag is housed in a case extending in a vehicle-body width direction is known (Japanese Unexamined Patent Application Publication No. 2005-280556).

In an airbag apparatus for pedestrian protection, in which an airbag is housed in a case extending in a vehicle width direction, a force is applied to the case in a width-expanding direction in a manner so as to separate a front wall portion and a rear wall portion of the case when the airbag is expanded. So as to oppose the force, a countermeasure to form the front wall portion and the rear wall portion of the case to have a thick wall, to form a rib, or the like is required.

SUMMARY OF THE INVENTION

It is an object of the present invention to provide an airbag apparatus capable of preventing or suppressing deformation of a case in a width-expanding direction when an airbag is expanded, by means of a simple countermeasure, in such an airbag apparatus for pedestrian protection in which an airbag is housed in the case extending in a vehicle-body width direction.

The airbag apparatus in the present invention is characterized in that an airbag apparatus is provided with an airbag for expanding along at least a part of a hood of the vehicle body, a case that houses the airbag, and an inflator for expanding the airbag, and the case has a bottom portion, a front wall portion at a front side of the vehicle body, and a rear wall portion at a rear side of the vehicle body. The case further includes at least one connecting member that connects each of middle portions in a longitudinal direction of the front wall portion and the rear wall portion of the case in the airbag apparatus extending in the vehicle-body width direction.

DETAILED EXPLANATION OF THE PREFERRED EMBODIMENT

An airbag apparatus of the present invention is provided with an airbag for being expanded along at least a part of a hood of a vehicle body, a case for hosing the airbag, and an inflator for expanding the airbag. The case extends in a vehicle-body width direction. The case is provided with a bottom portion, a front wall portion at a front side of the vehicle body, a rear wall portion at a rear side of the vehicle body, and a connecting member that connects each of middle portions in a longitudinal direction of the front wall portion and the rear wall portion.

In the airbag apparatus according to the present invention, the middle portions of the front wall portion and the rear wall portion of the case in the longitudinal direction are connected by the connecting member. Accordingly, deformation of the front wall portion and the rear wall portion is prevented or suppressed even when the front wall portion and the rear wall portion are pressed by the airbag in a separating direction when the airbag is expanded.

Although only one connecting member may be provided in the middle of the case in the longitudinal direction, a plurality of connecting members may be provided in a manner so as to have disposing positions different to each other in the longitudinal direction of the case, and when in such a configuration, a reinforcing effect of the case becomes high.

In the present invention, in a case that an inside of the case is partitioned into a plurality of chambers by the connecting member, the airbag may be individually disposed in each of the chambers, or the airbag may be continuously disposed across the chambers in a manner so as to allow the airbag to pass over an upper side of the connecting member.

Figure 1:
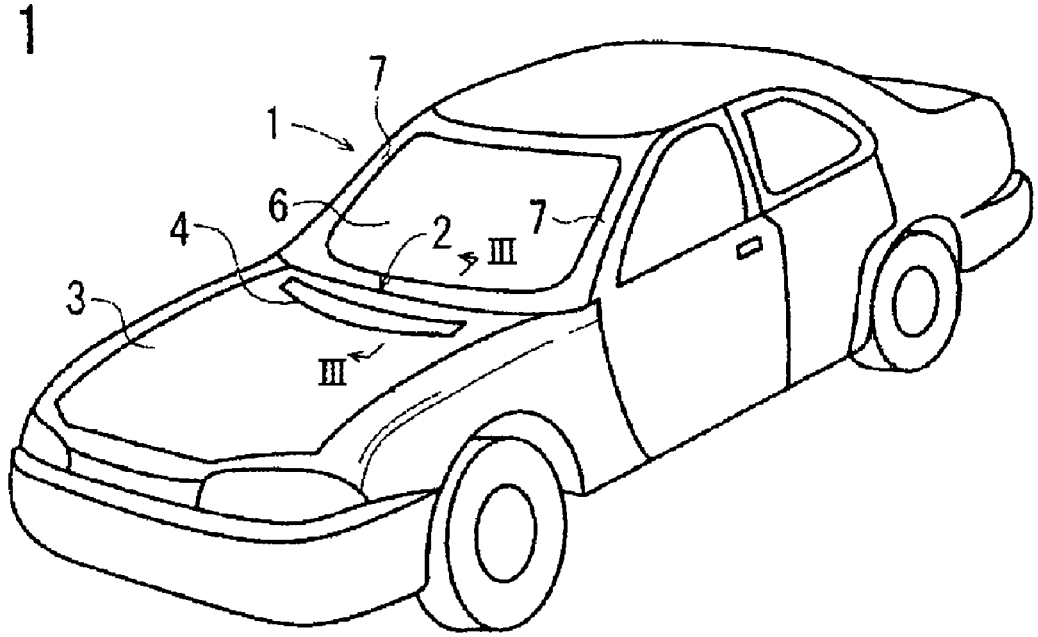
FIG. 1 is a perspective view of an automobile provided with an airbag apparatus according to an embodiment.
Figure 2:
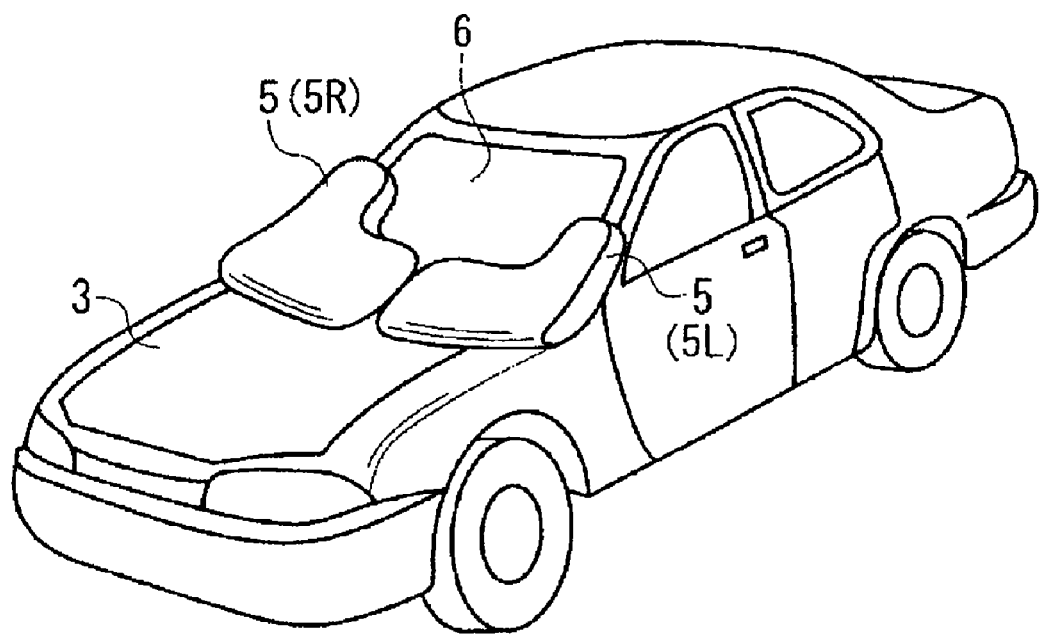
FIG. 2 is a perspective view of the automobile of FIG. 1 when an airbag is expanded.
Figure 3:
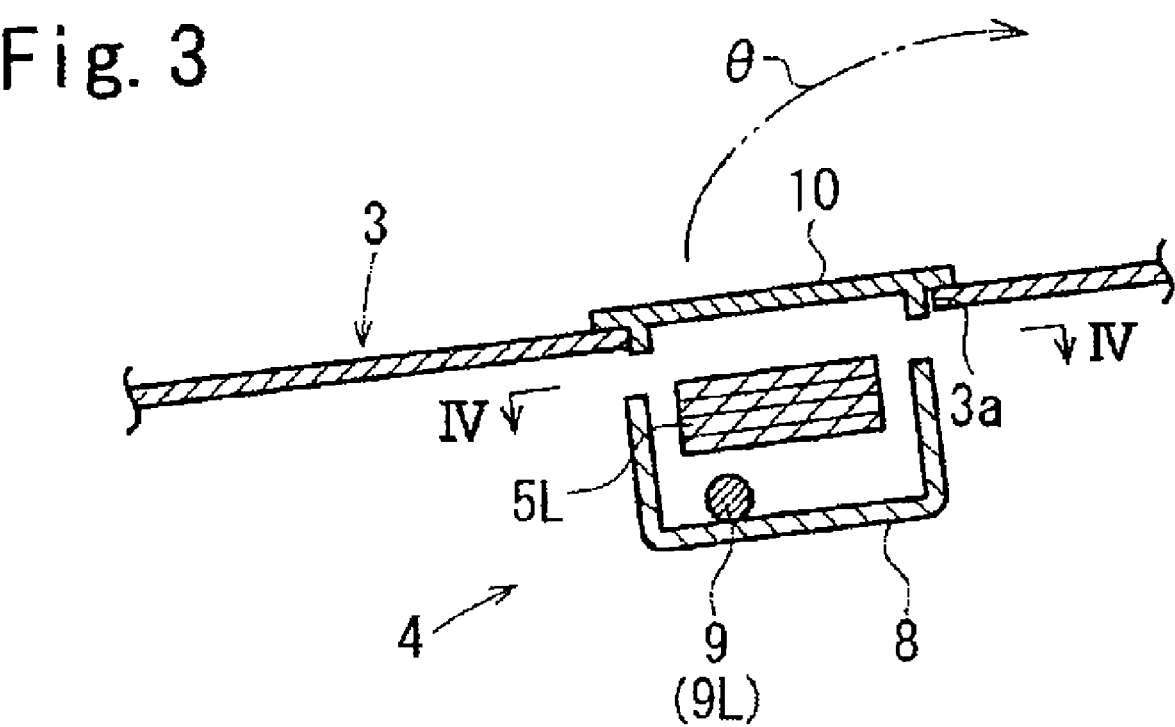
FIG. 3 is an enlarged cross-sectional view along a line III-III of FIG. 1.
Figure 4:
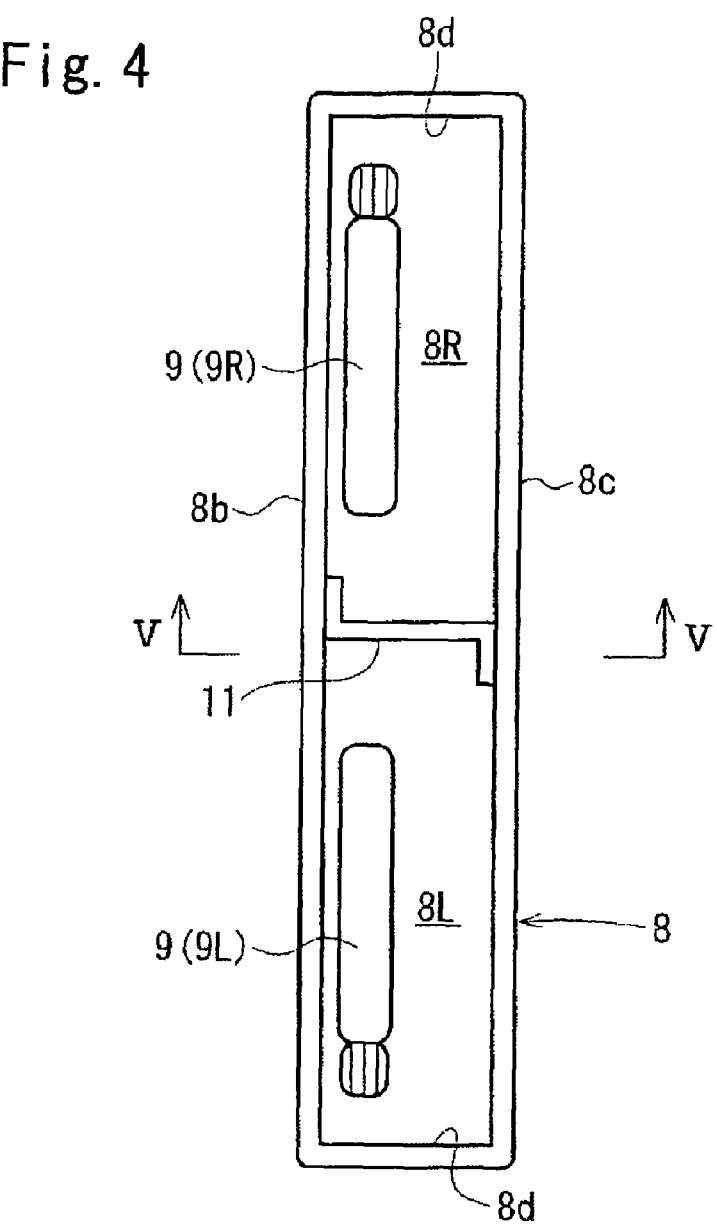
FIG. 4 is a view from a direction indicated by arrows IV-IV of FIG. 3.
Figure 5:
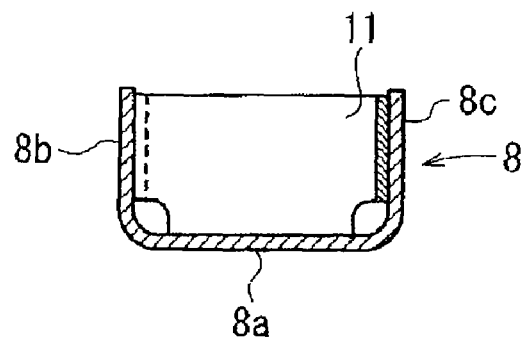
FIG. 5 is a cross-sectional view along a line V-V of FIG. 4.
Figure 6:
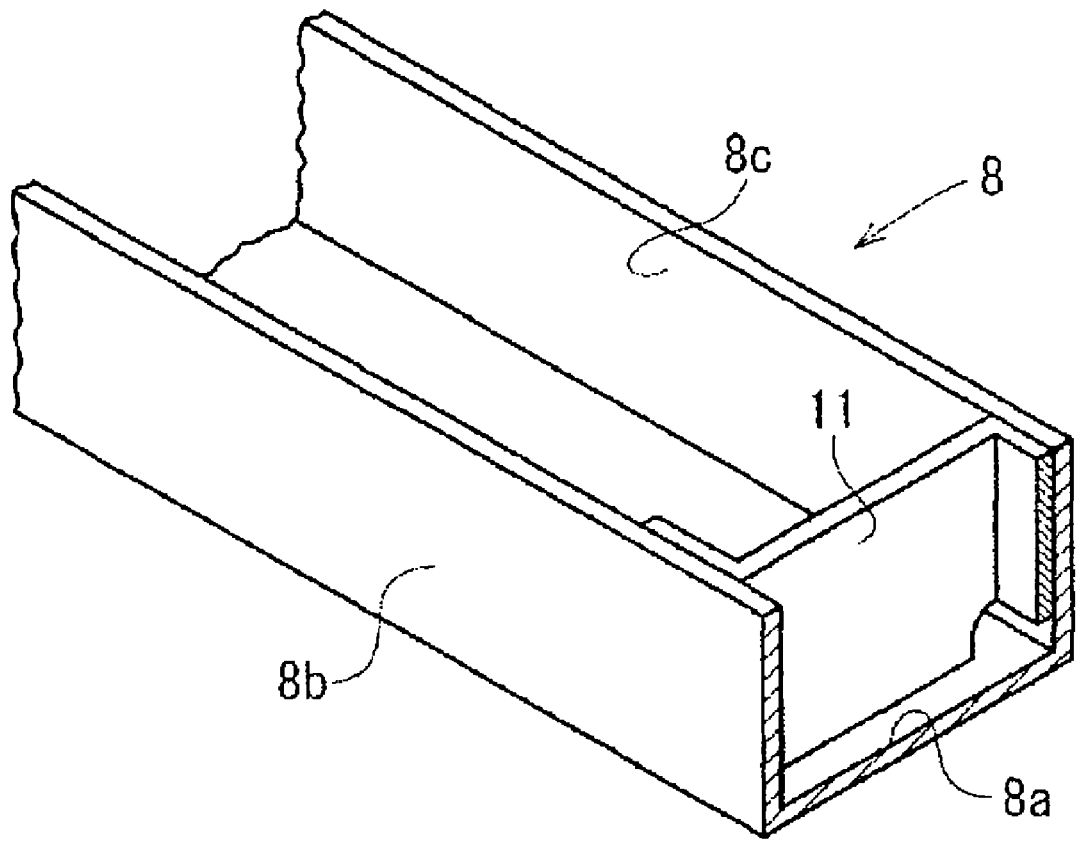
FIG. 6 is a cross-sectional perspective view of the same part as that of FIG. 5.

Hereinafter, an embodiment will be explained referring to the drawings. FIG. 1 is a perspective view of an automobile provided with an airbag apparatus according to the embodiment, FIG. 2 is a perspective view of the automobile of FIG. 1 when the airbag is expanded, FIG. 3 is an enlarged cross-sectional view along a line III-III of FIG. 1, FIG. 4 is a view from a direction indicated by arrows IV-IV of FIG. 3 (though illustration of the airbag is omitted), FIG. 5 is a cross-sectional view along a line V-V of FIG. 4, and FIG. 6 is a cross-sectional perspective view of the same part as that of FIG. 5.

As shown in FIG. 1, the present invention is not limited to a specific motor vehicle configuration although an automobile 1 is a four-door sedan in this embodiment. An airbag apparatus 4 for protecting pedestrians, motorcycle riders and so forth is installed at a rear portion of a hood 3. As shown in FIG. 2, a cowl louver 2, a windshield 6 and at least parts of left and right A-pillars 7 are covered with an airbag 5 (5L and 5R) of the airbag apparatus 4 when the airbag 5 (5L and 5R) is expanded.

As shown in FIG. 3 through FIG. 6, the airbag apparatus 4 is provided with a case 8 for housing the folded airbag 5 (5L and 5R), inflators 9 (9L and 9R) for expanding the airbag 5 (5L and 5R), a lid 10 closing an opening 3a of the hood 3, for passing the airbag 5 (5L and 5R) and so forth.

The case 8 has a long box-shape extending in the vehicle-body width direction. The case 8 includes a bottom portion 8a, a front wall portion 8b, a rear wall portion 8c and a left and right end walls 8d and 8d. An upper side of the case 8 is open.

In this embodiment, a tie plate 11 as a connecting member that connects the front wall portion 8b and the rear wall portion 8c is provided in the middle of the case 8 in a longitudinal direction.

The tie plate 11 is configured such that each of edges at a front wall portion 8b side and a rear wall portion 8c side is bent into L-shape. Each of the edges is firmly fixed to the front wall portion 8b and the rear wall portion 8c with welding or the like. However, a connecting structure of the tie plate 11 to the front wall portion 8b and the rear wall portion 8c is not limited thereto.

The tie plate 11 has a height reaching up to an upper edge of each of the front wall portion 8b and the rear wall portion 8c from the bottom portion 8a of the case 8.

An inside of the case 8 is partitioned into two chambers 8L and 8R at a left side and right side of the vehicle body, respectively by the tie plate 11. Accordingly, airbags 5L and 5R and inflators 9L and 9R are disposed in each of the chambers 8L and 8R in this embodiment. The airbags 5L and 5R are formed of separate bodies, and are independent from each other. The airbags 5L and 5R are firmly fixed to the case 8.

Although an illustration is omitted, the inflators 9L and 9R may be disposed outside of the case 8, and gas may be introduced into the airbags 5L and 5R by a gas-distribution member such as a duct or the like.

As shown in FIG. 5 or the like, in this embodiment, cutout portions (the sign is omitted) are formed at both ends of a lower side portion of the tie plate 11 (portions respectively facing a corner portion between the front wall portion 8b and the bottom portion 8a, and a corner potion between the rear end portion 8c and the bottom portion 8a of the case 8). Furthermore, gaps exist between the tie plate and each of the corner portions, respectively. The cutout portion is formed for simplifying formation of the tie plate 11, and is utilized as an insertion opening for a harness (an illustration is omitted) of each of the inflators 9L and 9R or the like, or as a drain outlet from each of the chambers 8L and 8R or the like.

The lid 10 is configured such that a rear edge thereof is fastened to the vehicle body via a hinge (not shown) at a rear edge of the opening 3a, and is configured to open out while rotating about the hinge rearward as indicated by an arrow θ in FIG. 3 when the airbag 5 (5L and 5R) is expanded. A front edge of the lid 10 is fastened to the vehicle body at a front edge of the opening 3a by means of a latch member (not shown) such as a clip or the like. The latch member is constructed to release a latching operation when the lid 10 is opened by being pressed by the airbag 5 (5L and 5R).

In a case that a pedestrian, a motorcycle rider, or the like collides with an automobile provided with the airbag apparatus 4 having such a construction, the inflator 9 is activated on the basis of a detection signal of a human body collision detection sensor (not shown), and the airbag 5 (5L and 5R) starts to be expanded by the blowing-out gas thereof. The lid 10 is opened by being pressed by the expanding airbag 5 (5L and 5R), and the airbag 5 (5L and 5R) is developed along an outer surface of the vehicle body as shown in FIG. 2.

When the airbag 5 (5L and 5R) is expanded, the front wall portion 8b and the rear wall portion 8c of the case 8 are pressed in a direction away from each other by the airbag 5 (5L and 5R). However, an expanding-out operation of the front wall portion 8b and the rear wall portion 8c is suppressed since the front wall portion 8b and the rear wall portion 8c are connected by the tie plate 11 in this embodiment. Furthermore, the airbag 5 (5L and 5R) is expanded upward, and is developed as shown in FIG. 2 while passing through the opening 3a.

In the embodiments in FIG. 1 through FIG. 6, the tie plate 11 is configured to have the height reaching up to the upper edges of the front wall portion 8b and the rear wall portion 8c, and the inside of the case 8 is partitioned into two chambers 8L and 8R. Accordingly, two of the airbags 5L and 5R are individually installed in each of the chambers 8L and 8R.

Figure 7:
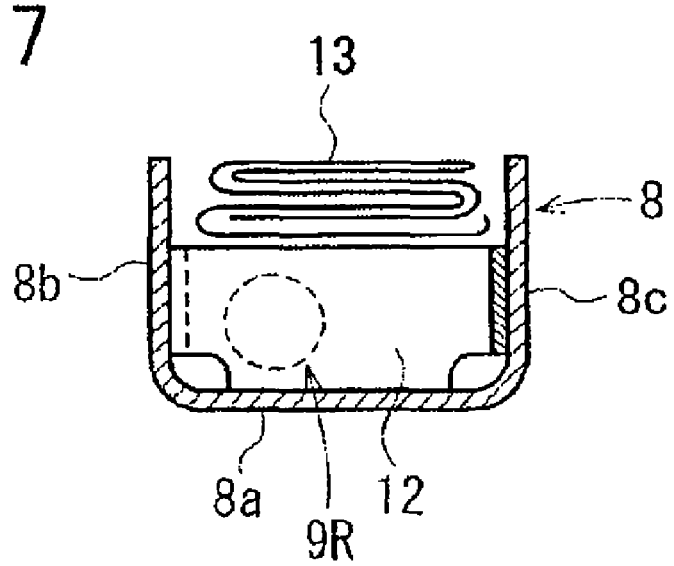
FIG. 7 is a cross-section of a case showing another embodiment.
Figure 8:
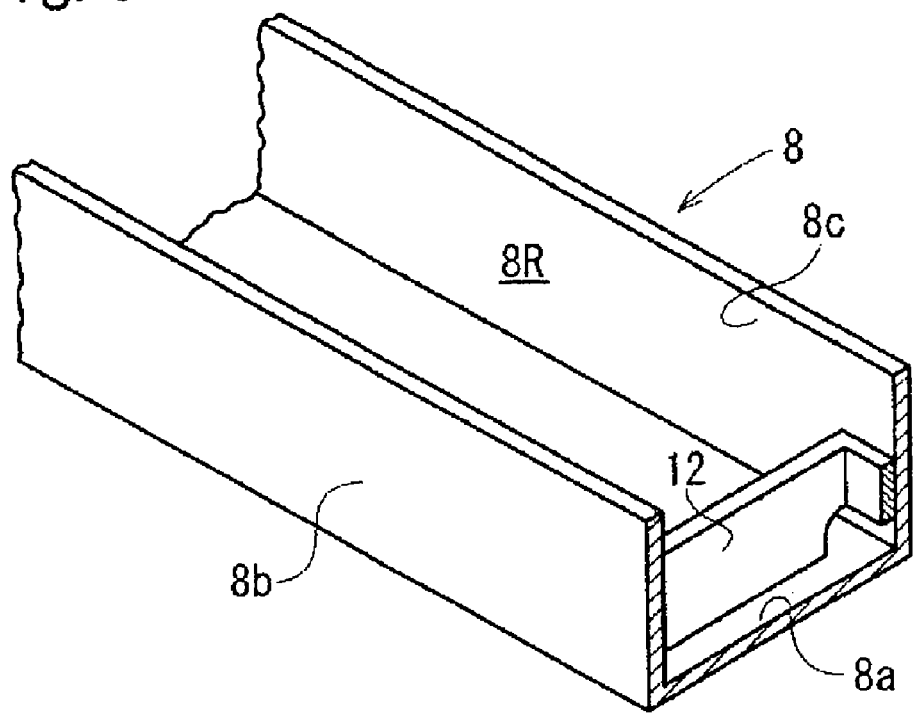
FIG. 8 is a cross-sectional perspective view of the case showing the another embodiment.
Figure 9:
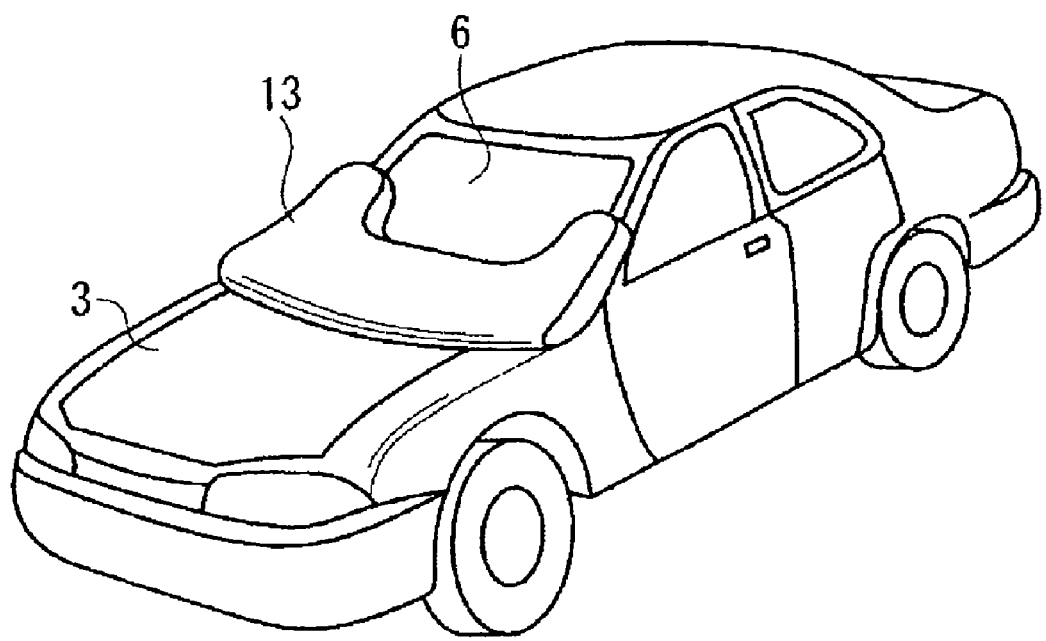
FIG. 9 is a perspective view of the automobile when the airbag is expanded.

FIG. 7 is a cross-sectional view of a case of an airbag apparatus according to another embodiment, FIG. 8 is a cross-sectional perspective view of the case, and FIG. 9 is a perspective view of an automobile when an airbag is expanded.

In the embodiment in FIG. 7 through FIG. 9, a tie plate 12 is configured to have a height in an extent of substantially half that of the front wall portion 8b and the rear wall portion 8c, and the folded airbag 13 is disposed at an upper side of the tie plate 12. The airbag 13 is continuously provided across the chambers 8L and 8R at both the left and right sides of the tie plate 12 passing over the upper side of the tie plate 12.

Accordingly, the airbag 13 is continuously expanded and developed in an integral manner from the left side to the right side of the vehicle body, as shown in FIG. 9.

Two of the inflators 9L and 9R are respectively disposed in each of the chambers 8L and 8R since the airbag 13 is extending in a left and right direction of the vehicle body to have a long shape. However, one inflator having gas-blowing outlets at both end sides in a longitudinal direction may be disposed across both of the chambers 8L and 8R. Furthermore, it is applicable to have a construction in which the gas is introduced into the airbag in each of the chambers 8L and 8R from the inflator disposed outside the case 8 via a duct.

Any of the aforementioned embodiments is an example of the present invention, and the present invention can take an embodiment other than that shown in the drawings.

For example, a connecting member other than the tie plate may be used. The connecting member may be that connecting only each of the upper edges of the front wall portion 8b and the rear wall portion 8c. Furthermore, two or more connecting members may be provided while being spaced apart in the vehicle-body width direction.

Although the present invention is explained in detail using a specific configuration, it is apparent for those skilled in the art that various modifications can be made without departing from intention and an area of the present invention.

The present application contains subject matter related to Japanese Patent Application (Japanese Unexamined Patent Application Publication No. 2006-016323) filed in the Japanese Patent Office on Jan. 25, 2006, the entire contents of which are incorporated herein by reference.

The invention claimed is:

1. An airbag apparatus for an automobile, the airbag apparatus comprising:
   an airbag for being deployed across a hood of the automobile;
   an elongate case for housing the airbag therein;
   an elongate bottommost wall of the case having forward and rearward edges and a substantially flat configuration extending therebetween;
   an elongate front wall of the case upstanding from the forward edge of the elongate bottommost wall to an upper front edge of the case front wall;

an elongate rear wall upstanding from the rearward edge of the elongate bottommost wall to an upper rear edge of the case rear wall;

an intermediate connecting member extending across the case between the front and rear walls with the connecting member being located approximately midway lengthwise along the elongate front and rear walls and having an upper edge that is below the upper front and rear edges of the respective front and rear walls;

a lower central portion of the intermediate connecting member that extends across and along the case bottommost wall engaged thereagainst substantially centrally between the front and rear walls; and opposite side chambers in the case on either side of the intermediate connecting member with the lower central portion thereof separating the side chambers from each other, the opposite side chambers lacking other connecting members extending thereacross, and the airbag being folded and fit in both side chambers to extend over the upper edge of the intermediate connecting member, wherein the intermediate connecting member includes right angle end flanges at either end thereof that extend in opposite directions so that one of the end flanges extends along one of the front and rear walls in one of the side chambers and the other end flange extends along the other of the front and rear walls in the other side chamber to provide the intermediate connecting member with oppositely extending L-shaped configurations at either end thereof.

2. The airbag apparatus according to claim 1, wherein an inflator is disposed in each of the side chambers.

3. The airbag apparatus according to claim 1, wherein the connecting member is a tie plate.

4. The airbag apparatus of claim 1, including an inflator that is disposed in at least one of the opposite side chambers on the substantially flat, bottommost wall.

5. The airbag apparatus of claim 4 wherein the inflator comprises a pair of inflators with one of the inflators on the bottommost wall in one of the side chambers and the other inflator on the bottommost wall in the other side chamber.

6. The airbag apparatus of claim 1 wherein the front and rear walls extend orthogonal to the bottommost wall and are of the same constant height between the respective upper front and rear edges thereof and the flat bottommost wall, and the intermediate connecting member extends orthogonal to the bottommost wall and has a constant height between the upper edge thereof and the flat bottommost wall that is approximately half of the height of the front and rear walls.

7. An airbag apparatus for an automobile, the airbag apparatus comprising:

an airbag for being deployed across a hood of the automobile;

an elongate case for housing the airbag therein;

an elongate bottommost wall of the case having forward and rearward edges and a substantially flat configuration extending therebetween;

an elongate front wall of the case upstanding from the forward edge of the elongate bottommost wall to an upper front edge of the case front wall;

an elongate rear wall upstanding from the rearward edge of the elongate bottommost wall to an upper rear edge of the case rear wall;

an intermediate connecting member extending across the case between the front and rear walls with the connecting member being located approximately midway lengthwise along the elongate front and rear walls and having an upper edge that is below the upper front and rear edges of the respective front and rear walls;

a lower central portion of the intermediate connecting member that extends across and along the case bottommost wall engaged thereagainst substantially centrally between the front and rear walls; and opposite side chambers in the case on either side of the intermediate connecting member with the lower central portion thereof separating the side chambers from each other, the opposite side chambers lacking other connecting members extending thereacross, and the airbag being folded and fit in both side chambers to extend over the upper edge of the intermediate connecting member, wherein the case has corner junctions between the bottommost wall and the front and rear walls and the connecting member comprises a tie plate that has lower corner cut-outs portions on either side of the lower central portion so that gaps are provided between the case corner junctions and the tie plate.

* * * * *